United States Patent Office 3,053,885
Patented Sept. 11, 1962

3,053,885
DERIVATIVES OF DIENESTROL
Emil Kaiser and Ellen Gunther, Chicago, Ill., assignors, by mesne assignments, to Armour-Pharmaceutical Company, a corporation of Delaware
No Drawing. Filed June 16, 1959, Ser. No. 820,587
8 Claims. (Cl. 260—479)

This invention relates to derivatives of dienestrol.

More particularly, this invention relates to allyl derivatives of dienestrol and to methods for their preparation. These new derivative compounds are useful as intermediates in the production of certain diallyl diethylstilbestrol and hexestrol derivatives, which derivatives are the subject matter of U.S. Patents No. 2,502,324 and No. 2,502,325.

The preferred starting material for preparing our derivatives is a pinacol-type compound, namely, 3,4-bis(4-hydroxyphenyl)-3,4-hexanediol. This diol is commercially available and is a mixture of the meso compound and the two optical antipodes. Although it is preferred to work with the meso compound, our derivatives may be prepared from mixtures of the meso and racemic forms of the diol.

The derivatives of this invention may be obtained by reacting 3,4-bis(4-hydroxyphenyl)-3,4-hexanediol with any allyl halide. It is preferred that the reaction be carried out in the presence of an alkaline compound capable of reacting with the hydrogen element of the halide. Examples of such alkaline compounds are potassium carbonate, calcium carbonate, sodium hydroxide, or barium hydroxide. Preferably, the reaction is conducted in an organic solvent which is not reactive with the derivative. Examples of such organic solvents are methylethyl ketone, acetone, benzene, and the like.

As indicated, any allyl halide, such as, for example, the bromide, iodide, or chloride may be employed. The halide is preferably added in slight excess over the theoretical amount required. The starting material and the allyl halide may be mixed in the solvent and heated in the presence of the halide receptor for several hours to complete the reaction. This is usually indicated by the formation of an insoluble material. Recovery and purification of the desired end product can then be achieved by well understood procedures.

The reaction is described by the following formulae:

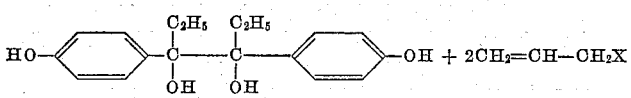
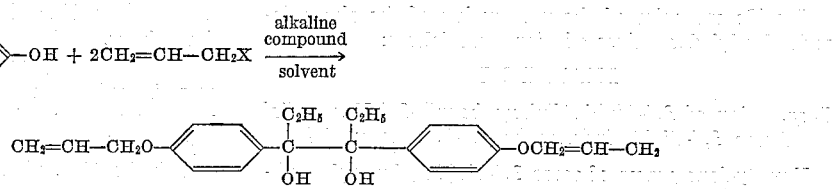

We have further discovered that the 3,4-bis(4-allyloxyphenyl)-3,4-hexanediol prepared in accordance with the above-described method may be converted to 3,4-bis-(3-allyl-4-hydroxyphenyl)-3,4-hexanediol by refluxing the first named compound with a suitable solvent such as diethylaniline in an inert atmosphere such as nitrogen gas. The reaction is found to be completed in about six hours. Lower temperatures usually require somewhat longer treatment times. The product thus produced is then brought into contact with a dilute acid solution and by well understood procedures is recovered and purified.

The reaction to prepare 3,4-bis(3-allyl-4-hydroxyphenyl)-3,4-hexanediol is described as follows:

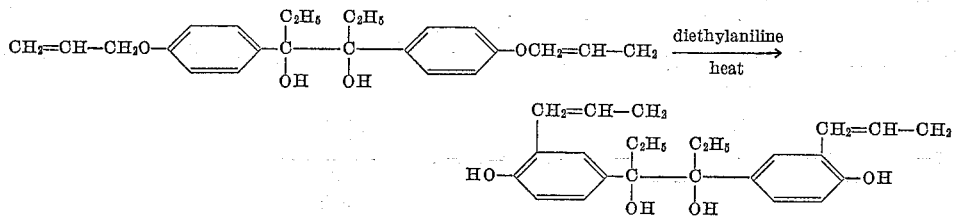

We have further discovered that 3,4-bis(3-allyl-4-hydroxyphenyl)-3,4-hexanediol prepared as described above may be used in the preparation of 3,3'-diallyldienestrol diacetate. This is achieved by heating the first mentioned compound in the presence of acetic anhydride and acetyl chloride. This reaction may be carried out at reflux temperatures after which the desired acetate is recovered and purified in accordance with well understood methods.

The reaction to prepare the 3,3'-diallyldienestrol diacetate from 3,4-bis(3-allyl-4-hydroxyphenyl)-3,4-hexanediol may be illustrated by the following formulae:

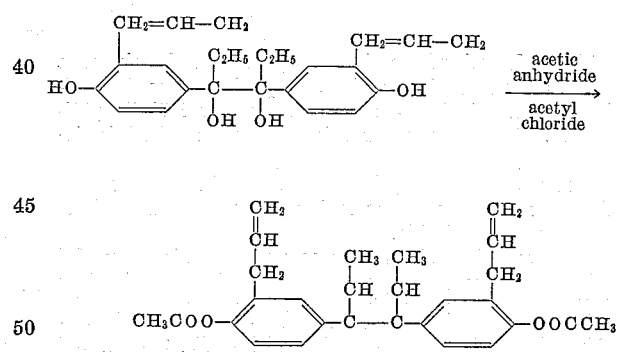

We have further found that the 3,3'-diallyldienestrol diacetate may be employed in the preparation of 3,3'-diallyldienestrol. This may be achieved by refluxing the 3,3'-diallyldienestrol diacetate with an alcoholic alkaline solution. Following completion of the reaction, solid carbon dioxide may be added to neutralize the solution and precipitate the product. Standard procedures may then be employed to recover and purify the desired compound.

The reaction to prepare the 3,3'-diallyldienestrol from 3,3'-diallyldienestrol diacetate is described as follows:

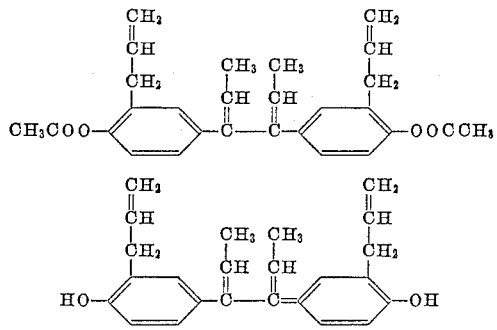

We further discovered that the 3,3'-diallyldienestrol described above may be obtained through an alternate procedure employing dienestrol as the starting material. This may be achieved by reacting the dienestrol with allyl halides to prepare the dienestrol diallyl ether.

The reaction for producing the dienestrol diallyl ether from dienestrol is described by the following formulae:

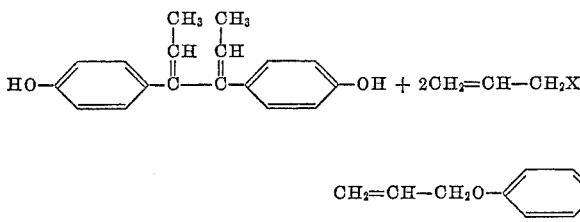

The reaction for preparing 3,3'-diallyldienestrol from dienestrol diallyl ether is illustrated by the following formulae:

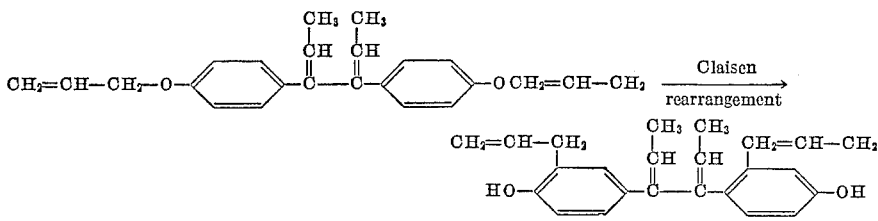

Although both of the alternate procedures hereinabove set out are extremely practical, we prefer to use the 3,3'-diallyldienestrol diacetate route to prepare 3,3'-diallyldienestrol. The reason for this preferred method is determined by the fact that free estrogens have been known to produce adverse physiological effects in workers handling them. Dienestrol is such an estrogen. Therefore, its use is less desirable.

We have indicated that our new compounds are useful as intermediates in preparing certain diallyl derivatives of diethylstilbestrol and hexestrol. By way of example, a representative method, employing 3,3'-diallyldienestrol to produce 3,3'-dipropylhexestrol, is illustrated by the following formulae:

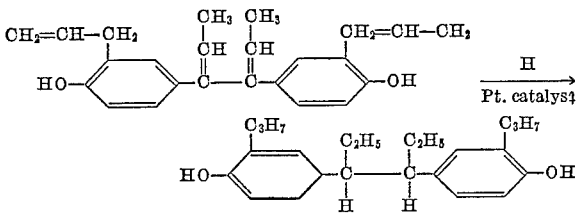

Specific examples of the preparation of the above-described allyl derivatives of dienestrol follow:

EXAMPLE I

*Preparation of 3,4-Bis(4-Allyloxyphenyl)-3,4-Hexanediol From 3,4-Bis(4-Hydroxyphenyl)-3,4-Hexanediol*

Twenty-four grams of meso 3,4-bis(4-hydroxyphenyl)-3,4-hexanediol, 26 grams of anhydrous potassium carbonate and 100 ml. of methyl ethyl ketone were stirred and refluxed while 15.6 ml. of allylbromide were added dropwise. Refluxing was continued for 13 hours. The insoluble material was filtered off and washed with methyl ethyl ketone. The combined filtrates were evaporated and the residue crystallized from ethanol. Yield of 3,4-bis(4 - allyloxyphenyl) - 3,4 - hexanediol was 24.5 grams, M.P. 134–136° C.

EXAMPLE II

*Preparation of 3,4-Bis(3-Allyl-4-Hydroxyphenyl)-3,4-Hexanediol from 3,4-Bis(4-Allyloxyphenyl)-3,4-Hexanediol*

1.95 grams of meso 3,4-bis(4-allyloxyphenyl)-3,4-hexanediol were added to 15 ml. of diethylaniline and the solution refluxed under nitrogen for 6 hours. After cooling, the reaction mixtures was poured into 200 ml. of 2 N hydrochloric acid, stirred and then extracted with ether. The ether extract was washed with water, dried over sodium sulfate and the solvent evaporated. 3,4-bis(3-allyl-4-hydroxyphenyl)-3,4-hexanediol was obtained as a viscous oil and was used without further purification in the next step.

EXAMPLE III

*Preparation of 3,3'-Diallyldienestrol Diacetate from 3,4-Bis(3-Allyl-4-Hydroxyphenyl)-3,4-Hexanediol*

A mixture of 10 ml. of acetic anhydride and 10 ml. of acetyl chloride was added to the oily 3,4-bis(3-allyl-4-hydroxyphenyl)-3,4-hexanediol and this solution was refluxed for 4 hours. After cooling, 400 ml. of water were added and the mixture extracted with ether. The ether extract was washed with a saturated sodium bicarbonate solution, then with water and dried over sodium sulfate. The ether was evaporated and the residue crystallized from ethanol. The crude compound melted at 134–142° C. It was recrystallized from an ether-petroleum ether mixture and 0.25 gram of 3,3'-diallyldienestrol diacetate, M.P. 140–144° C., were obtained.

EXAMPLE IV

*Preparation of 3,3'-Diallyldienestrol From 3,3'-Diallyldienestrol Diacetate*

.25 gram of 3,3'-diallyldienestrol diacetate was refluxed with a 10% alcoholic potassium hydroxide solution for 1 hour. After dilution with water, solid carbon dioxide was added, until a precipitate was obtained. This was filtered off, dried and crystallized from an ether-petroleum ether mixture. The crude product was recrystallized from dilute ethanol. The 3,3'-diallyldienestrol had a M.P. of 123–125° C.

EXAMPLE V

*Preparation of Dienestrol Diallyl Ether From Dienestrol*

1.3 grams of dienestrol, M.P. 224–227° C., were dissolved in 20 ml. of methyl ethyl ketone, 1.7 grams of anhydrous potassium carbonate added and 1.4 grams of allylbromide dropped slowly into the mixture which was then stirred and refluxed for 18 hours. The reaction mixture was worked up by the process described for the meso pinacol diallyl ether. After recrystallization from dilute methanol, the dienestrol diallyl ether had a M.P. of 87–90° C.

EXAMPLE VI

*Preparation of 3,3'-Diallyldienestrol From Dienestrol Diallyl Ether*

One gram of dienestrol diallyl ether was refluxed with 15 ml. of diethylaniline under nitrogen for 4 hours. After cooling, 2-N-hydrochloric acid was added. The mixture was extracted with ether, water washed, dried over sodium sulfate and the product crystallized by the addition of petroleum ether. After recrystallization from dilute methanol, 0.4 gram of 3,3'-diallyldienestrol, M.P. 123–125° C., was obtained. The infrared absorption curves were identical with that of the product of Example IV.

In the foregoing detailed description we have given specific examples and procedures illustrating the invention. It is understood that these specific examples are for illustration only and that the invention can be practiced in a great variety of ways.

We claim:
1. 3,3'-diallyldienestrol.
2. 3,3'-diallyldienestrol diacetate.
3. 3,4-bis(4-allyloxyphenyl)-3,4-hexanediol.
4. 3,4-bis(3-allyl-4-hydroxyphenyl)-3,4-hexanediol.
5. The diallyl ether of dienestrol.
6. An intermediate for the preparation of diallyl diethylstilbestrol and hexestrol derivatives having the formula:

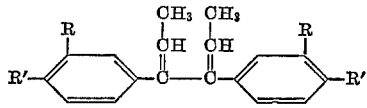

wherein R is selected from the group consisting of hydrogen and an allyl radical, and R' is selected from the group consisting of hydroxy, allyloxy and acetate radicals, provided that when R is hydrogen R' is allyloxy, and that when R is allyl, R' is hydroxy.

7. An intermediate for the preparation of diallyl diethylstilbestrol and hexestrol derivatives having the formula:

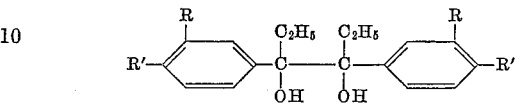

wherein R is selected from the group consisting of hydrogen and an allyl radical, and R' is selected from the group consisting of hydroxy and allyloxy radicals, provided that when R is hydrogen R' is allyloxy, and that when R is allyl R' is hydroxy.

8. An intermediate for the preparation of diallyl diethylstilbestrol and hexestrol derivatives having the formula:

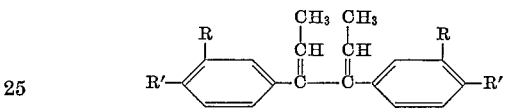

wherein R is selected from the group consisting of hydrogen and an allyl radical, and R' is selected from the group consisting of hydroxy, allyloxy and acetate radicals, provided that when R is hydrogen R' is allyloxy, and that when R is allyl, R' is acetate.

References Cited in the file of this patent

UNITED STATES PATENTS

| | | |
|---|---|---|
| 2,419,516 | Bloom et al. | Apr. 22, 1947 |
| 2,502,324 | Kaiser et al. | Mar. 28, 1950 |
| 2,502,325 | Kaiser et al. | Mar. 28, 1950 |